Nov. 17, 1925.
A. B. KNIGHT
1,562,342
GLASS WORKING BURNER
Filed Dec. 17, 1923   3 Sheets-Sheet 1
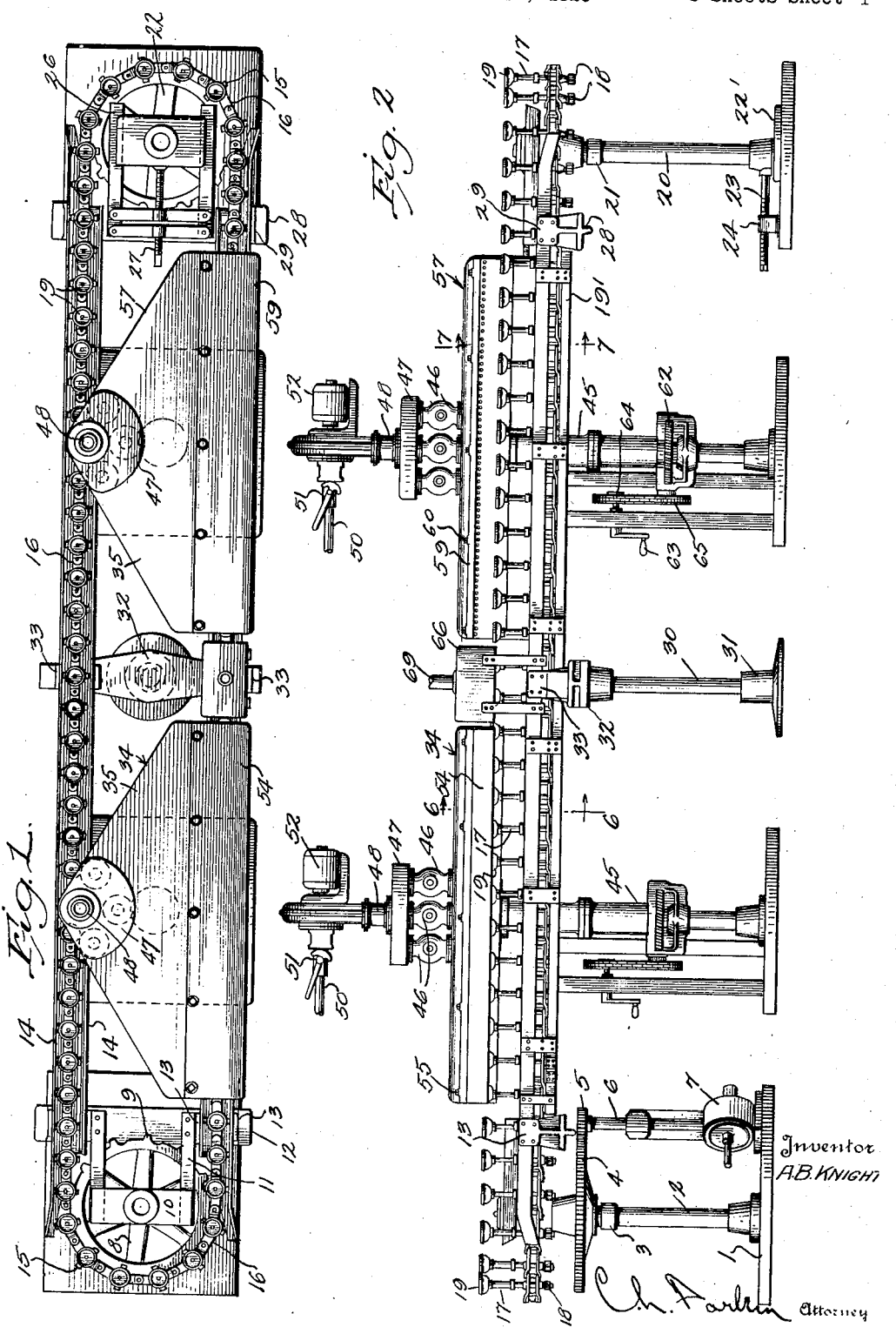

Nov. 17, 1925.
A. B. KNIGHT
GLASS WORKING BURNER
Filed Dec. 17, 1923
1,562,342
3 Sheets-Sheet 2
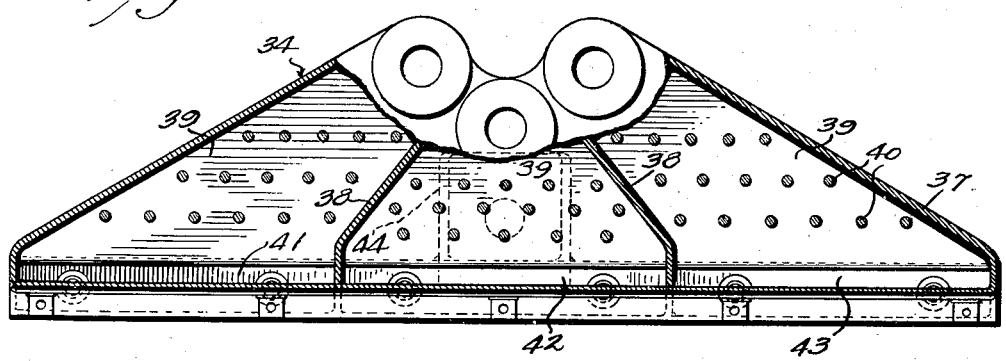
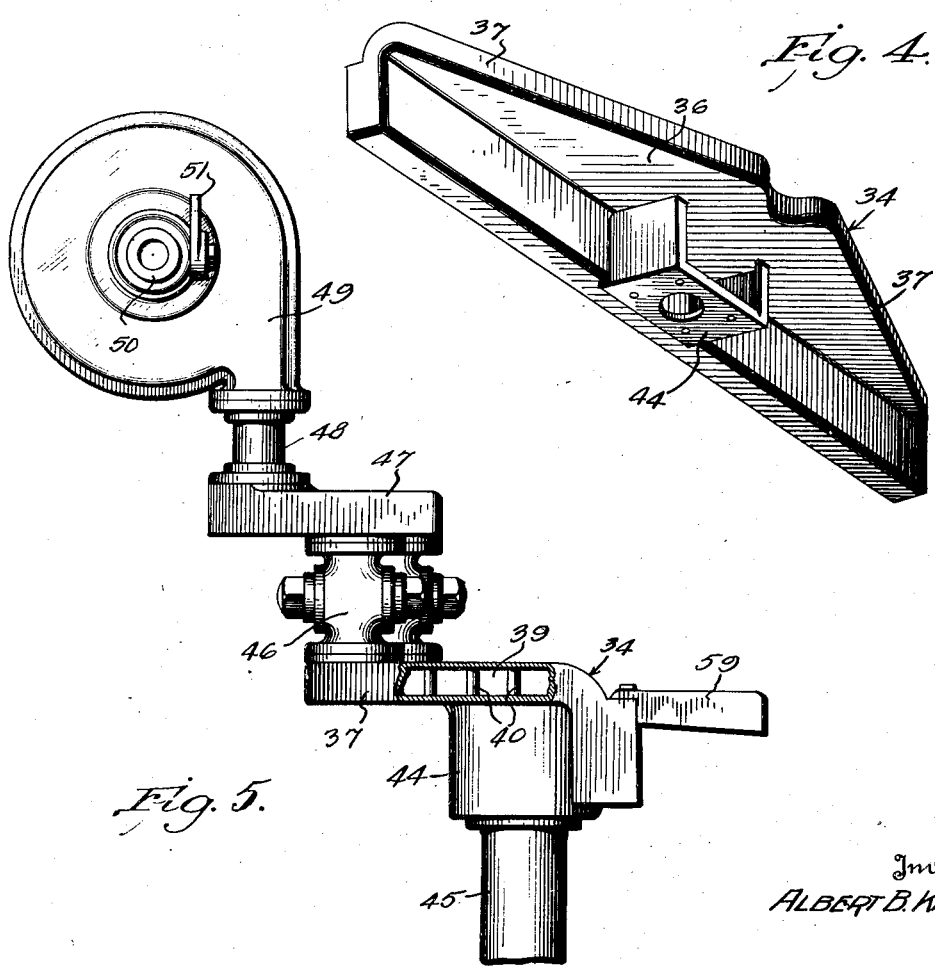
Inventor
ALBERT B. KNIGHT
By
Attorney Nov. 17, 1925.
A. B. KNIGHT
1,562,342
GLASS WORKING BURNER
Filed Dec. 17, 1923　　3 Sheets-Sheet 3
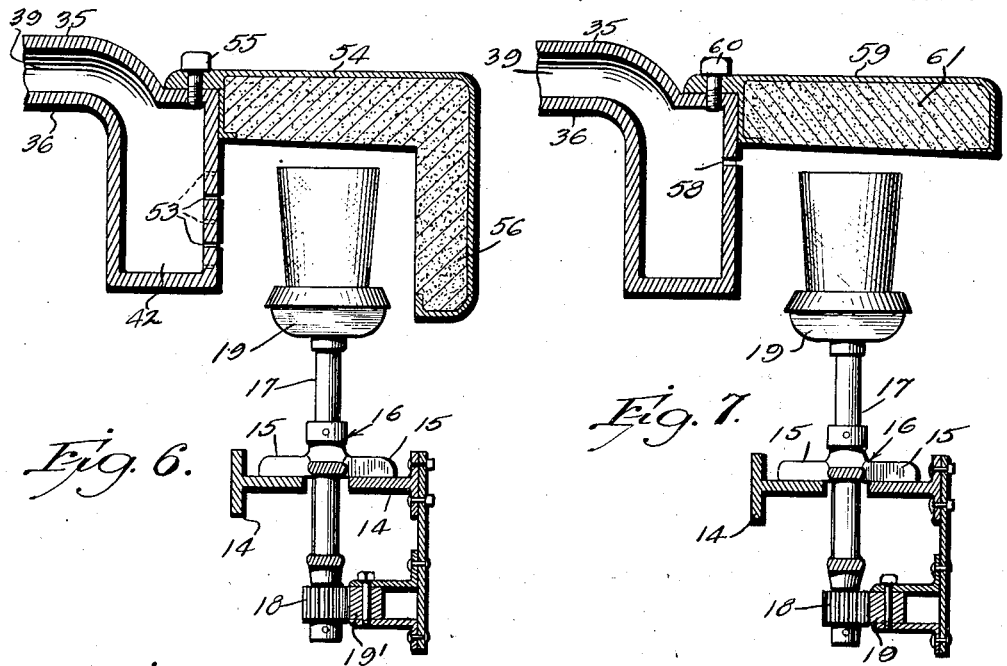
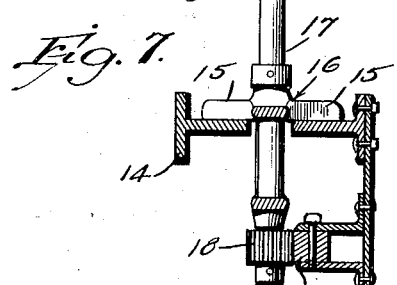
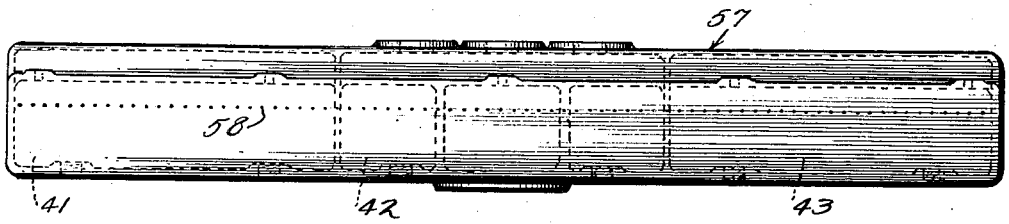
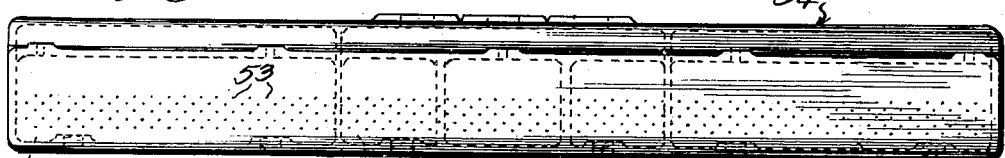
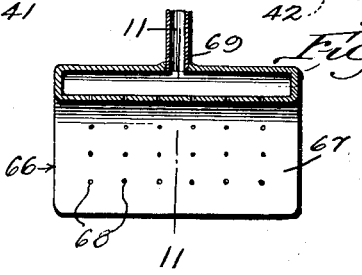
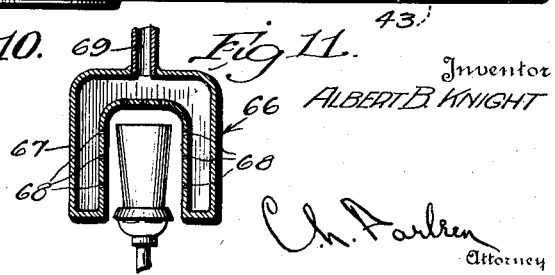
Inventor
ALBERT B. KNIGHT
Attorney Patented Nov. 17, 1925.

1,562,342

UNITED STATES PATENT OFFICE.

ALBERT BREAKENRIDGE KNIGHT, OF FAIRMONT, WEST VIRGINIA.

GLASS-WORKING BURNER.

Application filed December 17, 1923. Serial No. 681,232.

*To all whom it may concern:*

Be it known that I, ALBERT B. KNIGHT, a citizen of the United States, residing at Fairmont, in the county of Marion and State of West Virginia, have invented certain new and useful Improvements in Glass-Working Burners, of which the following is a specification.

This invention relates to glass working machines and more particularly to a burner construction adapted for use on machines for polishing and glazing pressed and other ware.

Due to the increased cost of labor and materials, glass manufacturers are practicing cost cutting policies in the manufacture of glass and in most instances this is effected by materially decreasing the expensive body materials of the glass batches. The decrease in the body materials in the batch results in ware which is incapable of withstanding sudden heat changes without breaking.

In view of the foregoing it has been found that glazing and polishing burners which heretofore have been thoroughly satisfactory in use, are now causing material losses to some manufacturers due to the fact that the ware is brought too suddenly into an area of intense heat.

An important object of the present invention is the provision of a burner by the use of which the edges of tumblers, sherbet glasses, etc., may be glazed and the sides of pressed ware of various kinds may be polished without danger of breakage as is caused by introduction of the ware into the intense heat of burners of the present type.

A further object is the provision of a unitary burner structure adapted to create heat areas of increasing intensities through which the glass ware is adapted to pass whereby it will be progressively heated to the proper fusing point.

A further object of the invention is to provide a device of the above mentioned character which is adapted to be fed from a common source of gas supply and being so constructed that it may be drilled for use either as a glazing burner or a polishing burner, or both.

Other objects and advantages of the invention will be apparent during the course of the following description.

In the drawings, I have shown one embodiment of the invention. In this showing—

Figure 1 is a plan view of a glazing and polishing machine embodying the invention, Figure 2 is a side elevation of the same, Figure 3 is a horizontal sectional view through one of the burners, Figure 4 is a perspective view of the same, Figure 5 is a side elevation of one of the burners and associated elements, parts being broken away, Figure 6 is a section taken on line 6—6 of Figure 2, Figure 7 is a similar view taken on line 7—7 of Figure 2, Figure 8 is a face view of one of the burners drilled for use in glazing, Figure 9 is a similar view of one of the burners drilled for use in polishing the sides of pressed ware, Figure 10 is a central vertical longitudinal sectional view through a cooling device, and, Figure 11 is a section on line 11—11 of Figure 10.

Referring to the drawings, the numeral 1 designates a supporting member adapted to rest upon the floor and this member supports a stationary vertical shaft 2. The shaft is provided intermediate its end with a thrust bearing 3 adapted to rotatably support a gear 4 which meshes with a pinion 5 mounted upon a second vertical shaft 6 adapted to be rotated by an electric motor 7 or other suitable source of power. A sprocket 8 is secured to the gear 4 to rotate therewith for a purpose to be described. As shown in Figure 1 the sprocket is provided with suitable teeth 9.

As will be understood the shaft 2 is stationary and a yoke 10 is mounted on the upper end of the shaft above the sprocket 8. This yoke is provided with arms 11 which are connected at their free ends with a supporting member 12 provided at each end with a pair of upstanding arms 13. The arms 13, at opposite sides of the support 12, are bolted or otherwise secured to a pair of rails 14 of substantially T-shape and these rails are adapted to be engaged by outstanding arms 15 on an endless conveyor 16. The conveyor consists of a plurality of suitable links which are engaged by the teeth 9 of the sprocket 8 to cause them to travel along the rails at opposite sides of the machine.

I preferably provide each of the links of the conveyor 16 with a rotatable spindle 17 and these spindles extend above and below the links. The spindles are provided at their lower ends with pinions 18 adapted to engage the teeth (not shown) of a rack 19'. It will be obvious that the movement of the conveyor with the pinions 18 in mesh with the rack teeth causes the spindles to rotate. The upper ends of the spindles are provided with supporting members or cups 19 in which the glass ware to be glazed and polished is placed as shown in Figures 6 and 7.

The end of the machine opposite the shaft 2 is provided with a second vertical shaft 20 as shown in Figure 2. This shaft is provided with a thrust bearing 21 adapted to support a sprocket 22 which is similar in construction to the sprocket 8. It is obvious that the sprocket 22 is an idler sprocket and I provide means connected with this sprocket for taking up slack in the conveyor 16. As shown in Figure 2 the lower end of the shaft 20 is mounted to slide longitudinally in guides 22' and an adjusting screw 23 mounted in a support 24 is adapted to force the lower end of the shaft outwardly as will be obvious. The upper end of the shaft 20 is connected with a cross head 25 slidably mounted in parallel arms 26. An adjusting screw 27 is mounted between the arms 26 and is adapted to move the upper end of the shaft longitudinally in a manner similar to the screw 23. The inner ends of the arms 26 are connected with a cross member 28 similar to the member 12 previously described and this member is provided at opposite sides of the machine with a pair of upstanding arms 29 secured to the rails 14 to form a support therefor.

A standard 30 is arranged centrally of the machine and is carried by a base 31 resting upon the floor. The upper end of the standard 30 is provided with a cross member 32 having upstanding arms 33 for supporting the central portions of the rails.

The numeral 34 designates as a whole a polishing burner which, as shown in Figures 1, 3 and 4, is of a substantially fan shape and has its broader side arranged inwardly of and adjacent the rails 14 at the front of the machine. The burner 34 comprises generally a pair of fan shaped upper and lower walls 35 and 36 closed by an edge wall 37 as shown in Figure 3. The space between the walls 35 and 36 is divided by preferably integral vertical walls 38 to form a plurality of fan shaped mixing chambers 39. The lower wall is provided in its rear portion with an opening 39' communicating with each chamber 39 and the upper and lower walls in each chamber 39 are connected by preferably integral pins 40 as shown in Figures 3 and 5. The chambers 39 are connected at their forward ends with depending burner chambers 41, 42 and 43 and the walls 38 extend into these chambers so that the gases in the chambers 39 are prevented from mixing. The burner 34 is provided upon its under side with a supporting member 44 adapted to be mounted upon a vertical standard 45 as shown in Figures 2 and 5.

Each of the chambers 39 is connected through valves 46 with a gas manifold 47 into which gas is introduced through a pipe 48 (see Figure 5). A blower 49 is connected with the pipe 48 and this blower may be of any preferred type such as the centrifugal blower illustrated. Gas may be supplied to the blower 49 through a pipe 50 provided with a cut off valve 51. An electric motor 52 supplies the power for rotating the blower whereby gas may be forced under pressure to each of the chambers 39.

The wall forming the closure for the outer portions of the chambers 41, 42 and 43 is substantially flat throughout its length and arranged parallel to the rails 14 and this wall is provided with a plurality of rows of openings 53 preferably arranged in staggered relation and these openings form burner nozzles by which the flames may be directed against the sides of the glass ware. A substantially L-shaped shield 54 is bolted to the burner 34 as at 55 and this shield is preferably filled with refractory material such as fire clay or the like 56. The shield and the refractory material with which it is filled tend to maintain the heat from the burner openings in close contact with the glass ware.

As shown in Figures 1 and 2, the burner 34 is mounted to one side of the center of the machine and a second burner designated as a whole by the reference numeral 57 is arranged at the opposite side of the center of the machine. This burner is similar in construction to the burner 34 except as to the arrangement of the burner openings and need not be described in detail. As shown in Figure 7, the burner 57 is provided with a single row of burner openings 58 adapted to project the flame across the upper edge of the glass ware to glaze it. A shield 59 is bolted to the burner 57 as at 60 and this shield projects only across the top of the glass ware and does not extend outside the ware as does the shield 54. The shield 59 is also filled with refractory material 61 and this material is so arranged that the lower surface thereof slopes downwardly and outwardly at a slight angle from the burner 57 to confine the flames from the burner openings in close contact with the edges of the glass ware.

Each of the burners 34 and 57 is adapted to be supported by a standard 45 as previously described. The standards 45 are adapted to be raised and lowered to adjust the burners for glass ware of varying heights by rotation of a gear 62 to which motion is transmitted by an operating crank 63, sprocket 64, chain 65 and suitable gearing not shown.

As shown in Figures 1 and 2 the inner ends of the burners 34 and 57 are spaced apart a substantial distance and a cooling hood 66 is arranged in this space. This hood comprises substantially U-shaped spaced inner and outer walls 67 and the inner walls are arranged adjacent and upon opposite sides of the glass ware as it passes from the burner 34 to the burner 57. The head 67 is provided in its inner wall with a plurality of openings 68 and air is supplied to the head 67 through a pipe 69.

The operation of the machine is as follows:

The motor 7 is started and the sprocket 8 is rotated in a counterclockwise direction to move the forward run of the conveyor from left to right past the burners as shown in Figure 1. The operator places the glass ware in the holders 19 so that they will be conveyed past the burners.

The valves 46 of the burner 34 are so regulated that a relatively small flow of gas is permitted to the burner chamber 41, an increased amount to the chamber 42, and a relatively large amount to chamber 43. When the gas is lighted it will be obvious that heat areas of varying intensities are created in front of the burner 34 and the intensity of the heat increases from left to right as seen in Figures 1 and 3. Thus when the glass ware first comes in contact with the flames of the burner it is first slightly heated and then progressively raised to a higher temperature until, while passing the chamber 43, it is heated to a proper fusing point so that the sides of the glass will be polished. The same operation takes place as the glass ware passes the burner 57 except that only the upper edges of the glass ware are heated whereby they may be properly glazed.

The blowers 49 serve to force the flames outwardly under pressure in the usual manner. The provision of the pins 40 in the chambers 39 serves to intimately mix the gas and air supplied to the burner nozzles through openings 39' so that proper combustion is obtained.

As the glass ware passes from the burner 34 to the burner 57 fairly warm air is supplied under pressure through the pipe 69 and hood 66 to carry off some of the heat retained by the glasses so that they will not lose their form through softening when subjected to the heat of burner 57. It has been found that in the use of the above described burner the provision of heat areas of progressively increasing intensity gradually heats the glasses to the proper fusing point without sudden temperature changes so that small loss is incurred through breakage.

It will be obvious that the standards 45 may be varied to properly direct the flames from the burners according to the height of the glass ware being treated. After passing the burners the glass ware may be collected at any suitable point, preferably upon the opposite side of the machine.

The burners 34 and 57 are identical in every respect except as to the arrangement of the burner nozzles. The burners are cast with a solid wall at the forward end and then may be drilled for use either as a polishing or glazing burner. When drilled for use as a polishing burner the staggered openings 53 are drilled to provide a relatively wide band of flame adapted to cover the sides of the glass ware throughout their length. When used as a glazing burner the casing may be drilled as at 58 to provide a thin flame adapted to contact only with the upper edges of the glass ware.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. A device of the character described comprising a substantially fan shaped casing divided to form a plurality of substantially fan shaped mixing chambers having a common wall at their outer ends, said wall being provided with a plurality of sets of burner nozzles each set communicating with one of said chambers, means for conveying articles of glassware progressively past said nozzles, means for supplying fuel to said chambers, and means for independently controlling the flow of fuel to said chambers whereby heat areas of progressively increasing intensity are provided adjacent said nozzles in the path of travel of the glassware.

2. A device of the character described comprising an integral substantially fan shaped shallow casing divided by integral walls to form a plurality of substantially fan shaped mixing chambers terminating outwardly in relatively deep burner chambers having a common outer wall of substantial width and length, said wall being provided with a plurality of sets of burner nozzles each set communicating with one of said chambers, means for supplying gas and air to said chambers, means in said chambers for mixing the gas and air, and independently operable means for controlling the amount of fuel supplied to each of said chambers.

3. A device of the character described comprising an integral substantially fan shaped shallow horizontal casing divided by integral walls to form a plurality of substantially fan shaped mixing chambers, said chambers being provided at their outer ends with depending relatively deep burner chambers having a common flat outer wall of substantial width and length, said wall being provided with a plurality of sets of burner nozzles, each set communicating with one of said chambers, a pipe communicating with the inner end of each of said chambers, a valve arranged in each of said pipes, a manifold communicating with said pipes, and means for supplying gas and air to said manifold.

4. A device of the character described comprising an integral substantially fan shaped shallow horizontal casing divided by integral walls to form a plurality of substantially fan shaped mixing chambers, spaced integral pins connected between the upper and lower walls of each of said chambers, said chambers terminating outwardly in relatively deep depending burner chambers having a common flat outer wall of substantial width and length, said wall being provided with a plurality of sets of burner nozzles, each set communicating with one of said chambers, means for supplying gas and air to said chambers, and independently operable means for controlling the amount of fuel supplied to each of said chambers.

In testimony whereof I affix my signature.

ALBERT BREAKENRIDGE KNIGHT.